Patented June 9, 1964

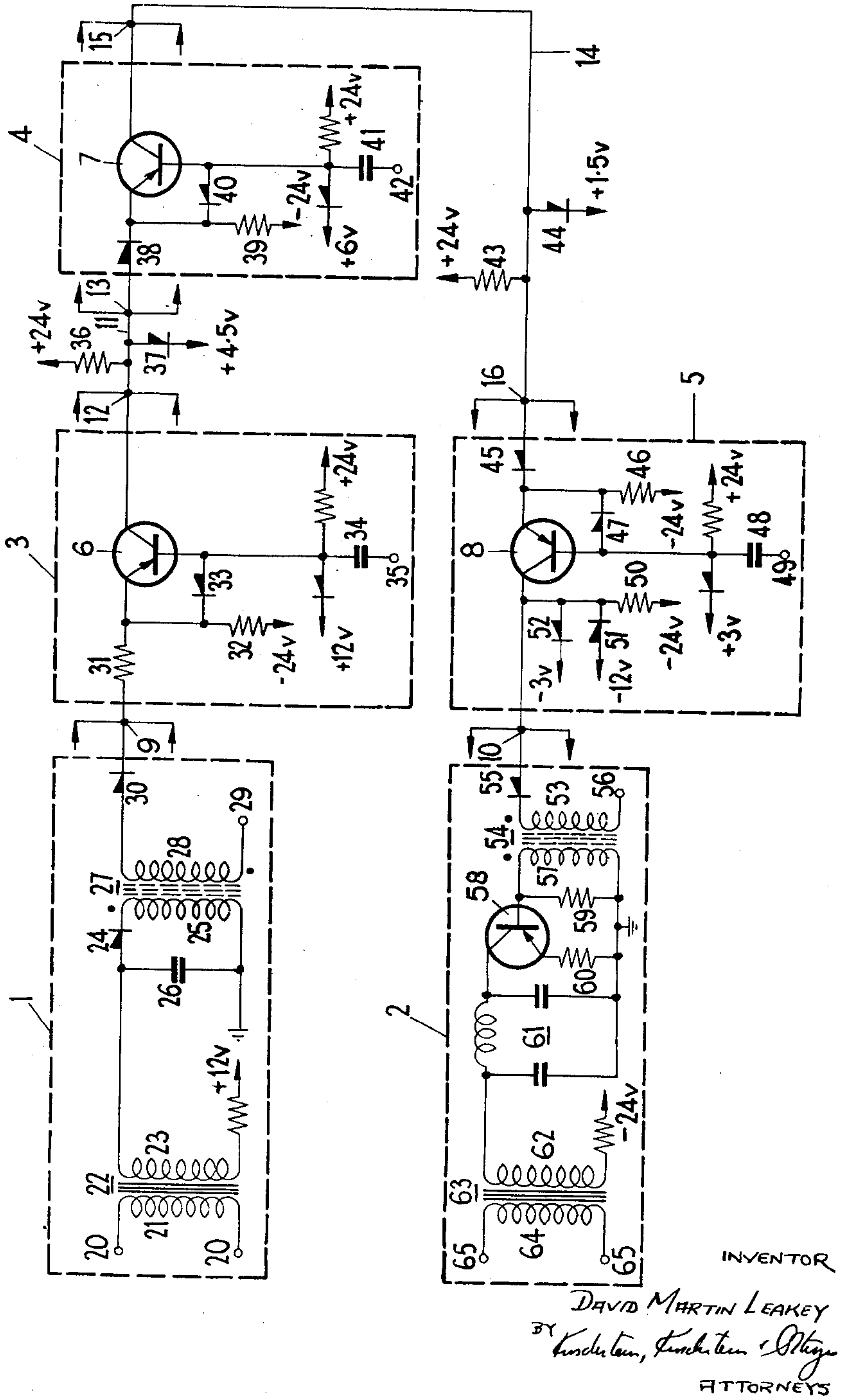
INVENTOR
DAVID MARTIN LEAKEY
BY Kirschstein, Kirschstein & Ottinger
ATTORNEYS United States Patent Office 3,136,859

3,136,859

CURRENT-PULSE TRANSMISSION SYSTEM EMPLOYING POTENTIAL RESTORATION MEANS ALONG THE TRANSMISSION PATH

David Martin Leakey, Ruislip, England, assignor to The General Electric Company Limited, London, England Filed Sept. 14, 1961, Ser. No. 138,036

Claims priority, application Great Britain Sept. 16, 1960

8 Claims. (Cl. 179—15)

This invention relates to electric pulse transmission systems.

It is an object of the present invention to provide an improved form of electric pulse transmission system.

According to the present invention an electric pulse transmission system comprises a pulse transmission path in which a plurality of pulse transfer stages (for example, gating stages) are connected together in cascade, the input impedance of each stage being low compared with the output impedance of its immediately preceding stage in the path, means to supply pulses of current to be transmitted along the transmission path through said stages, a plurality of direct current biasing means which include a plurality of resistances respectively, each said resistance being connected to the transmission path within a respective section of the path so that current passed by that resistance after the passage of any said pulse along the respective section restores that section to a predetermined potential before the passage of the next pulse, the arrangement being such that during the transmission of any said pulse along the transmission path, current which is then passed by at least one of the resistances augments the pulse so as to compensate at least in part thereby, for loss of current of the pulse through another or others of said resistances as the pulse is transmitted along the transmission path.

The pulse transmission path of an electric pulse transmission system has stray capacities inherently associated therewith, and these stray capacities tend to store charges dependent upon the pulses previously transmitted over the path. In consequence the path has a "memory" of the previous pulses and this memory can result in interference with later pulses transmitted along the path. Additional "memory" arising from other factors is generally introduced into the transmission path by the pulse transfer stages of the path.

The disadvantages of "memory" may be particularly acute where the transmission path forms part of a multichannel communication system in which communication signals are transmitted along the path as the amplitude modulation of pulse trains that are combined in time division multiplex. In this case the "memory" associated with the path can result in undesirable cross-talk between the channels.

The effects of stray capacities in contributing to "memory" can be reduced by arranging that the voltage amplitude of each transmitted pulse is as small as possible. This has led to the proposal of operating an electric pulse transmission system in a current-pulse mode rather than, as has been more usual in the past, in a voltage-pulse mode. With the voltage-pulse mode of operation pulses are recognised by transient changes in voltage, and are amplitude modulated by effecting variation in the pulse voltage, without regard to current. In contrast, with the current-pulse mode of operation pulses are recognised by transient changes in current, and are amplitude modulated by effecting variation in the pulse current, without regard to voltage. The pulse transfer stages in the transmission path of an electric pulse transmission system using the current-pulse mode of operation have input impedances that are low compared with the output impedances of their immediately preceding stages in the path, since it is the pulse current that is of significance in the system.

The successful operation of such a system can be obtained using smaller voltage changes than with a corresponding system operated in the voltage-pulse mode, and this has the consequent advantage of a reduced degree of "memory."

Although the adoption of the current-pulse mode of operation can reduce the degree of "memory," this reduction is not in general sufficient by itself. The remaining "memory" may be reduced however by arranging that the various sections of the path are restored to predetermined potentials after the passage of each pulse along those respective sections. This can be achieved, using an electric pulse transmission system in accordance with the present invention, in a comparatively simple manner without at the same time incurring undue reduction in magnitude of current pulses transmitted along the transmission path.

An electric pulse transmission system in accordance with the present invention, which system is for use in an automatic telephone exchange in which speech signals are transmitted in time division multiplex, will now be described, by way of example, with reference to the accompanying drawing. The drawing shows the circuit of the transmission system as this extends between a pulse modulator in a first telephone subscriber's line circuit and a pulse demodulator in a second telephone subscriber's line circuit.

Referring to the drawing, a pulse modulator 1 is connected to a pulse demodulator 2 over a pulse transmission path which includes three transistor gating stages 3, 4 and 5 that are connected together in cascade. The stages 3, 4 and 5 include respective P-N-P junction transistors 6, 7 and 8 which are connected in the common-base circuit configuration so that the input impedance of each stage 3, 4 and 5 is low compared with the output impedance of the immediately preceding stage in the transmission path.

In the telephone exchange of which the system shown in the drawing forms part, each subscriber has an individual pulse modulator and an individual pulse demodulator such as the modulator 1 and the demodulator 2. The subscribers are divide into groups of one hundred and each group is sub-divided into ten sub-groups of ten subscribers each. The modulator 1 and the demodulator 2 shown in the drawing belong to subscribers within the same group, the nine other modulators in the same subgroup as the modulator 1 being connected to the pulse transmission path at a junction 9, and the nine other demodulators in the same sub-group as the demodulator 2 being connected to the transmission path at a junction 10.

The transistor stage 3 is common to the sub-group which includes the modulator 1, and is connected to a "Go" highway 11 at a junction 12 which is common to all ten sub-groups of the group under consideration. The highway 11 is connected at a junction 13 to a plurality of transistor gating stages such as the stage 4, which serve to connect the highway 11 to a "Return" highway 14 at a junction 15. The highway 14 is common to the same group as the highway 11, and is connected at a junction 16 to the stage 5. The stage 5 is common to the subgroup that includes the modulator 2, and serves to interconnect the junctions 16 and 10.

There are a plurality of other groups (not shown) in the exchange, and the Go highway 11 is coupled to the Return highways (corresponding to the highway 14) of these other groups by means of transistor gating stages (corresponding to the stage 4) that are connected to the highway 11 at the junction 13. Furthermore the Go highways (corresponding to the highway 11) of the other groups are coupled to the Return highway 14 by means of other transistor gating stages (corresponding to the stage 4) which are connected to the highway 14 at the junction 15.

In the modulator 1 a pair of input terminals 20 for the reception of speech signals from the associated subscriber are connected to apply those signals across the primary winding 21 of a transformer 22. A secondary winding 23 of the transformer 21 is connected to apply the speech signals to vary the magnitude of direct current which normally flows through a rectifier 24 and a winding 25 that are connected in series. A capacitor 26 is connected in shunt with the series-connected rectifier 24 and winding 25.

The winding 25 is one winding of a pulse transformer 27 which has a second winding 28. The winding 28 is connected at one end to a gating-pulse input terminal 29, and at the other end through a rectifier 30 to the junction 9.

The junction 9 is connected to the emitter electrode of the transistor 6 through a resistor 31. A resistor 32 is connected between the emitter electrode of the transistor 6 and a twenty-four volt negative bias source. The resistor 32 provides a discharge path to earth for the emitter circuit of the transistor 6 in the intervals between pulses that are applied to the junction 9 from the modulators (such as the modulator 1).

A rectifier 33 is connected between the base and emitter electrodes of the transistor 6 to clamp the emitter electrode to a potential which is slightly negative with respect to the base electrode while the transistor 6 is in its normal non-conducting state in the intervals between the pulses from the junction 9. The transistor 6 is of the graded-base type and the rectifier 33 serves to limit to a safe value the reverse voltage which may appear across the emitter-to-base junction of the transistor 6. The base electrode of the transistor 6, which is normally maintained at a potential of twelve volts positive with respect to earth, is connected through a capacitor 34 to a gating-pulse input terminal 35. The collector electrode of the transistor 6 is connected directly to the highway 11 at the junction 12.

A resistor 36 is connected to the highway 11 to provide a discharge path to earth for the highway 11 during the intervals between pulses applied to the junction 12. A rectifier 37 is also connected to the highway 11, the resistor 36 and the rectifier 37 being connected in series across a direct current source such that whenever the rectifier 37 conducts between pulses the highway 11 is clamped to a potential which is slightly greater than 4.5 volts positive with respect to earth.

The emitter electrode of the transistor 7 in the stage 4 is connected to the junction 13 through a rectifier 38. A resistor 39 which is connected between the emitter electrode and a twenty-four volt negative bias source provide a discharge path for the emitter circuit of the transistor 7 in the intervals between pulses applied through the rectifier 38 from the highway 11. The transistor 7 is of the graded-base type, and a rectifier 40 is connected between the emitter and base electrodes to clamp the emitter electrode to a potential which is slightly negative with respect to the base electrode while the transistor 7 is non-conducting in the intervals between pulses from the highway 11. The base electrode, which is normaly maintained at a potential of six volts positive with respect to earth, is connected through a capacitor 41 to a gating-pulse input terminal 42. The collector electrode of the transistor 7 is connected directly to the highway 14 at the junction 15.

A resistor 43 and a rectifier 44 are connected to the highway 14 to provide a discharge path for the highway 14 and to clamp it to a potential which is slightly greater than 1.5 volts positive with respect to earth, during the intervals between pulses applied to the junction 15.

The emitter electrode of the transistor 8 in the stage 5 is connected to the highway 14 through a rectifier 45. A resistor 46 which is connected between the emitter electrode and a twenty-four volt negative bias source provides a discharge path for the emitter circuit of the transistor 8. A rectifier 47, which is connected between the emitter and base electrodes of the transistor 8, serves to clamp the emitter electrode to a potential which is slightly negative with respect to the base electrode during the intervals between pulses applied through the rectifier 45. The transistor 8, which is of the graded-base type, is normally non-conducting, the base electrode being normally maintained at a potential of three volts positive with respect to earth and being connected through a capacitor 48 to a gating-pulse input terminal 49. The collector electrode of the transistor 8 is connected directly to the junction 10, a discharge path for the collector circuit being provided by a resistor 50 which is connected between the collector electrode and a twenty-four volt negative bias source. Two rectifiers 51 and 52 are also connected to the collector electrode circuit of the transistor 8 to clamp the collector electrode to a potential which is slightly less than twelve volts negative with respect to earth while the transistor 8 is non-conducting, and to limit the potential of the collector electrode to three volts negative with respect to earth when the transistor 8 conducts.

In the demodulator 2 a primary winding 53 of a pulse transformer 54 is connected at one end to receive pulses from the junction 10 through a rectifier 55, and at the other end is connected to a gating-pulse input terminal 56. A secondary winding 57 of the transformer 54 is connected to the base electrode of a P-N-P junction transistor 58 which is arranged to amplify signals appearing across the winding 57. A resistor 59 is connected across the winding 57 to reduce spurious oscillation of the base-to-emitter circuit of the transistor 58, and a resistor 60 is included in the emitter circuit to stabilise the gain of the transistor 58.

The collector electrode of the transistor 58 is connected to a twenty-four volt negative bias source through a low-pass filter 61 and a primary winding 62 of a transformer 63. Speech-frequency signals that are applied across the winding 62 from the transistor 58 in operation are induced in a secondary winding 64 of the transformer 63, and, thereby appear across a pair of output terminals 65.

Trains of gating pulses are applied to the terminals 29, 35, 42, 49 and 56 in order to establish a connection between the modulator 1 and the demodulator 2 during operation of the telephone exchange. The gating pulses applied to the terminal 35 each have a duration of 0.5 microsecond and those applied to the terminals 29, 42, 49 and 56 each have a duration of 0.7 microsecond. The trains of gating pulses are such that pulses are applied concurrently to the terminals 29, 35, 42, 49 and 56 at intervals of one hundred microseconds.

The normal potential of the terminal 29 is some three volts positive with respect to earth, and in these circumstances the transistor 6 is non-conductive, the emitter electrode of the transistor 6 then being held at a potential which is slightly negative with respect to the base electrode due to conduction of the rectifier 33 through the resistor 32. A large proportion of the nine volts potential difference between the terminal 29 and the base electrode of the transistor 6 appears across the rectifier 30 which in these circumstances effectively isolates the modulator 1 from the stage 3.

The gating pulses applied to the terminals 29 and 35 have amplitudes of six volts, those applied to the terminal 29 being positive-going and those applied to the terminal 35 negative-going. The application of gating pulses to either one of the terminals 29 and 35 in the absence of gating pulses at the other, does not result in any change in the normal non-conducting condition of the transistor 6. When however gating pulses are applied concurrently to the two terminals 29 and 35 the rectifier 33 ceases to conduct and the transistor 6 conducts, with the result that a voltage pulse of nearly three volts amplitude appears across the winding 28. This pulse, as reflected in the winding 25, causes the rectifier 24 to become non-conducting. The capacitor 26, which although of small enough value to present a sensible impedance to speech signal components, is of large enough value to delay rise in voltage across the series-connected rectifier 24 and winding 25, such that the rectifier 24 remains non-conductive throughout the period of the concurrent gating pulses applied to the terminals 29 and 35. Owing to the fact that the total current flowing through the transformer 27 cannot change very rapidly, the break in flow of current through the winding 25 that results from the non-conduction of the rectifier 24, causes a pulse of current to flow in the winding 28. The magnitude of this pulse when no speech signals are applied between the terminals 20 is fifteen milliamps, and varies by as much as five milliamps above and below this current "pedestal," in accordance with the speech signals applied between the terminals 20.

The current pulse appearing in the winding 28 causes current to flow in the resistor 32 as well as in the transistor 6. The current which flows in the resistor 32 is one half milliamp so that the resulting pulse of collector current from the transistor 6 is approximately one half milliamp less in magnitude than the pulse appearing in the winding 28.

The successive pulses of the gating pulse trains applied to the terminals 29 and 35 cause the modulator 1 to supply a train of current pulses through the gating stage 3 to the highway 11. This train of pulses is modulated by the speech signals applied between the terminals 20 of the modulator 1, the pedestal current of the pulse train being approximately 14.5 milliamps, and the amplitudes of the pulses varying by as much as five milliamps above and below the pedestal value in accordance with the instantaneous amplitudes of the speech signals. After the passage of each pulse from the modulator 1 to the stage 3, the emitter electrode of the transistor 6 is returned within 0.2 microsecond to a potential which is independent of the pulse. In this connection the resistor 32 provides a discharge path to ensure that the transistor 6 together with the rectifiers (such as the rectifier 30), and the stray capacities that are associated with the emitter circuit of the transistor 6, are discharged. The emitter electrode of the transistor 6 is thereafter maintained at a constant potential by conduction of the rectifier 33.

The train of amplitude modulated pulses that is supplied to the highway 11 by the gating stage 3 is routed through the gating stage 4 by the gating pulses that are applied to the terminal 42. These latter gating pulses, which are negative-going and have an amplitude of three volts, cause the rectifier 40 to become non-conductive and the transistor 7 conductive, so that a train of amplitude modulated pulses corresponding to the train received from the stage 3 appears in the collector circuit of the transistor 7.

During the flow over the highway 11 of each pulse from the gating stage 3, the rectifier 37 is non-conducting, and current which then flows through the resistor 36 augments the pulse from the stage 3 by one-half milliamp. However, one-half milliamp of each input pulse to the stage 4 flows through the resistor 39, the rectifier 40 being non-conductive during each input pulse. Thus over the highway 11 and the emitter circuit of the transistor 7 there is a gain and a loss of one-half milliamp in the current of each pulse. In consequence there is substantially no change between the amplitude of the modulated pulse train as supplied by the stage 3 to the highway 11, and as appearing in the collector circuit of the transistor 7.

The currents which flow through the resistors 36 and 39 after each pulse supplied from the stage 3, cause the highway 11 and the emitter electrode of the transistor 7 respectively, to be returned within 0.2 microsecond to constant potentials independent of the transmitted pulse. The resistor 36 provides a discharge path to ensure that the transistors (such as the transistor 6), the rectifiers (such as the rectifier 38), and the stray capacities, that are all associated with the highway 11 are discharged. The highway 11 is thereafter maintained at a constant potential by conduction of the rectifier 37. Similarly the resistor 39 provides a discharge path to ensure that the transistor 7 and the rectifier 38 together with stray capacities associated with the emitter circuit of the transistor 7, are discharged. Conduction of the rectifier 40 thereafter clamps the emitter electrode of the transistor 7 to a constant potential.

The train of amplitude modulated pulses that is supplied to the highway 14 by the gating stage 4 is routed through the gating stage 5 by the gating pulses that are applied to the terminal 49. These latter gating pulses, which are negative-going and have an amplitude of three volts, cause the rectifier 47 to become non-conductive and the transistor 8 conductive, so that a train of amplitude modulated pulses corresponding to the train received from the stage 4 appears in the collector circuit of the transistor 8.

The amplitude modulated pulses that flow in the collector circuit of the transistor 8 are routed to the demodulator 2 in response to the gating pulses applied to the terminal 56. The potential of the terminal 56 is normally that of earth but the gating pulses which are applied to this terminal are negative-going and have an amplitude of twelve volts. In consequence, the modulated pulses of collector current which are derived in the stage 5 from the train of pulses received from the gating stage 4, flow through the winding 53 of the transformer 54 for demodulation in the demodulator 2.

During the flow over the highway 14 of each pulse from the gating stage 4, the rectifier 44 is non-conducting and current which then flows through the resistor 43 augments the pulse by one milliamp. However, one-half milliamp of each input pulse to the stage 5 flows through the resistor 46, the rectifier 47 being non-conducting during each input pulse. Thus over the highway 14 and the emitter circuit of the transistor 8 there is an overall gain of one half milliamp in pulse current.

While the transistor 8 conducts the rectifier 51 in the collector circuit of the transistor 8 is non-conducting, and one-half milliamp of the collector current pulses flows through the resistor 50. The resultant pedestal current of the train of collector current pulses which flow through the winding 53 in the demodulator 2 is therefore approximately 14.5 milliamps.

In the demodulator 2 the transistor 58 remains non-conducting for the duration of each pulse in the winding 53, and then conducts for a period which is much longer than that pulse. The speech signal modulation of the train of pulses applied to the demodulator 2 is derived by the low-pass filter 61 from the resulting train of lengthened, and amplified, pulses which appear in the collector circuit of the transistor 58. The speech signals from the subscriber associated with the modulator 1 therefore appear as desired between the terminals 65.

The transmission of the speech signals between the modulator 1 and the demodulator 2 of course takes place concurrently with the transmission of speech signals between other modulators and demodulators in the telephone exchange. However the communication between the modulator 1 and the demodulator 2 (and correspondingly, between other modulators and demodulators) is substantially free from cross-talk. One of the main reasons for this is that although the pulse trains conveying the speech signals between the modulator 1 and the demodulator 2 when passing over the path between the junctions 9 and 10 are interlaced with pulse trains carrying other speech signals, the various sections of this path are repeatedly restored to constant potentials after each pulse. This ensures that the path has substantially no "memory" of the preceding pulses, such a "memory" being one of the main potential causes of cross-talk in time division multiplex signal transmission systems.

The resistors 32, 39, 46 and 50 connected to the transmission path in the stages 3, 4 and 5 ensure that sections of this path are discharged so as to be returned to respective constant potentials during the intervals between pulses. However the presence of these resistors connected to the transmission path is a disadvantage during the actual flow of a pulse over the transmission path, because there is a loss of current from the pulse at each of these resistors. As described above there is a loss of one-half milliamp at each of the resistors 32, 39, 46 and 50, so that between the modulator 1 and the demodulator 2 there is a loss of two milliamps in each pulse due to these four resistors. However compensation for three-quarters of this loss is provided by the currents which flow in the two resistors 36 and 43, these currents augmenting each pulse by one-half milliamp and one milliamp respectively. The resistors 36 and 43 in addition to providing compensation for loss of current during the flow of the pulses, also provide discharge paths for respective sections, the highways 11 and 14, of the pulse transmission path during the intervals between pulses.

It will be appreciated that if the two resistors 36 and 43, instead of being connected to twenty-four volt positive bias sources, were connected to negative bias sources in the manner of the resistors 32, 39, 46 and 50, then there would be an overall loss of pulse current throughout the transmission path of 3.5 milliamps. This loss would necessitate an increase of some three milliamps in the pedestal current supplied by the modulator 1 in order that the pulses received by the demodulator 2 should have sufficient pedestal current for optimum operation. With the arrangement of the resistors 36 and 43 as shown in the drawing, however, the overall loss in pedestal current is only one-half milliamp, so the modulator 1 is required to supply only one-half milliamp more pedestal current than is required by the demodulator 2.

The rectifiers 37 and 44 in addition to ensuring that the highways 11 and 14 are clamped to respective potentials of 4.5 and 1.5 volts positive with respect to earth during the intervals between pulses, also ensure that the potentials of the highways 11 and 14 cannot rise in a positive-going sense, above these values during the pulses. There may be a tendency for the potentials of the highways 11 and 14 to exceed these values if none of the gating stages following those respective highways are opened by appropriately-timed gating pulses.

The pulse transmission path that is shown in the accompanying drawing includes only three pulse transfer stages, namely the gating stages 3, 4 and 5. It will be appreciated that there may be many more than just three pulse transfer stages in the path. In fact the advantages to be gained by use of the present invention are in general greater the greater the number of pulse transfer stages.

I claim:

1. An electric pulse transmission system comprising:

(A) a plurality of transistors each of which has emitter, base and collector electrodes;

(B) means connecting the transistors in cascade with one another to provide a current-pulse transmission path having an input end and an output end;

(C) means to supply pulses of current to the input end of said transmission path for transmission along the transmission path to the output end thereof; and (D) a plurality of direct current biasing means each of which is connected to a respective one of a plurality of points along the transmission path to restore the relevant point to a predetermined potential after the passage of each said current pulse past that point in said transmission path.

(*a*) a first of said biasing means including a first resistance connected at one of its two ends to said path at a first of said points, and means to apply a bias potential to the other end of said first resistance which potential is less in the positive sense than the potential of said first point at least during each said pulse so that the first resistance receives current from said transmission path at said first point during each said pulse, and (*b*) a second of said biasing means including a second resistance connected at one of its two ends to said path at a second of said points, and means to apply a bias potential to the other end of said second resistance which potential is larger in the positive sense than the potential of said second point at least during each said pulse so that current is supplied to said transmission path at said second point through said second resistance during each said pulse, (*c*) loss of current of each said pulse in one of said first and second resistances being at least in part compensated for by the current flow in the other.

2. An electric pulse transmission system comprising:

(A) a plurality of transistor gate circuits each including a respective transistor which has emitter, base and collector electrodes and which is connected in a common-base circuit configuration to be normally non-conductive;

(B) means for applying gating pulses to the base electrodes of the transistors of the gate circuits to render the respective transistors conductive;

(C) means connecting the gate circuits in cascade with one another to provide a pulse transmission path having an input end and an output end;

(D) means to supply pulses of current to the input end of said transmission path for transmission through the gate circuits in turn to the output end of the path; and (E) a plurality of direct current biasing means each of which is connected to a respective one of a plurality of points along the transmission path to restore the relevant point to a predetermined potential after the passage of each said current pulse past that point in said transmission path, (*a*) a first of said biasing means including a first resistance connected at one of its two ends to said path at a first of said points, and means to apply a bias potential to the other end of said first resistance which potential is less in the positive sense than the potential of said first point at least during each said current pulse so that the first resistance receives current from said transmission path at said first point during each said current pulse, and (*b*) a second of said biasing means including a second resistance connected at one of its two ends to said path at a second of said points, and means to apply a bias potential to the other end of said second resistance which potential is larger in the positive sense than the potential of said second point at least during each said current pulse so that current is supplied to said transmission path at said second point through said second resistance during each said current pulse, (*c*) loss of current of each said current pulse in one of said first and second resistances being at least in part compensated for by the current flow in the other.

3. An electric pulse transmission system according to claim 2 wherein the means for supplying pulses of current to the input end of the transmission path includes a pulse modulator for supplying to said input end a pulse train having a current magnitude dependent upon the amplitude of an input signal.

4. An electric pulse transmission system comprising:

(A) a plurality of transistor gate circuits each including a respective transistor which has emitter, base and collector electrodes and which is connected in a common-base circuit configuration to be normally non-conductive;

(B) means for applying gating pulses to the base electrodes of the transistors of the gate circuits to render the respective transistors conductive;

(C) means connecting the gate circuits in cascade with one another to provide a pulse transmission path having an input end and an output end;

(D) means to supply pulses of current to the input end of said transmission path for transmission through the gate circuits in turn to the output end of the path;

(E) a plurality of first biasing means each of which includes a first resistance connected at one of its two ends to a respective one of a plurality of first points along the transmission path, and means for applying a bias potential to the other end of said first resistance which potential is less in the positive sense than the potential of the respective first point so that the first resistance receives current from said transmission path to restore the respective first point to a predetermined potential after the passage of each said current pulse past that point in said transmission path; and (F) a plurality of second direct current biasing means each of which includes a second resistance connected at one of its two ends to said path at a respective one of a plurality of second points along the transmission path, and means for applying a bias potential to the other end of said second resistance which potential is larger in the positive sense than the potential of the respective second point so that current is supplied to said transmission path through said second resistance to restore the respective second point to a predetermined potential after the passage of each said current pulse past that point in said transmission path;

(G) loss of current of each said current pulse in one said plurality of biasing means being at least in part compensated for by gain in pulse current in the other said plurality of biasing means.

5. An electric pulse transmission system comprising:

(A) a plurality of transistors each of which has emitter, base and collector electrodes and is connected in a common-base circuit configuration;

(B) means connecting the common-base transistor circuits in cascade with one another to provide a pulse transmission path having an input end and an output end;

(C) means to supply pulses of current to the input end of said transmission path for transmission along the transmission path to the output end thereof; and (D) a plurality of direct current biasing means each of which is connected to a respective one of a plurality of points along the transmission path to restore the relevant point to a predetermined potential after the passage of each said current pulse past that point in said transmission path, (*a*) a first of said biasing means including a first resistance connected at one of its two ends to said path at a first of said points, means for applying a bias potential to the other end of said first resistance which potential is less in the positive sense than the potential of said first point at least during each said pulse so that the first resistance receives current from said transmission path at said first point during each said pulse, a first rectifier, and means connecting said first rectifier to said first point so as on the one hand to conduct and thereby clamp said first point to a predetermined potential in the absence of any said pulse at said first point, and on the other hand to be non-conductive during a said pulse at said first point, and (*b*) a second of said biasing means including a second resistance connected at one of its two ends to said path at a second of said points, means for applying a bias potential to the other end of said second resistance which potential is larger in the positive sense than the potential of said second point at least during each said pulse so that current is supplied to said transmission path at said second point through said second resistance during each said pulse, a second rectifier, and means connecting said second rectifier to said second point so as on the one hand to conduct and thereby clamp said second point to a predetermined potential in the absence of any said pulse at said second point, and on the other hand to be non-conductive during each said pulse at said second point.

6. An electric pulse transmission system comprising:

(A) a plurality of transistor gate circuits each including a respective transistor which has emitter, base and collector electrodes and which is connected in a common-base circuit configuration to be normally non-conductive;

(B) means for applying gating pulses to the base electrodes of the transistors of the gate circuits to reduce the potentials of the base electrodes in such a sense as to render the respective transistors conductive;

(C) means connecting the gate circuits in cascade with one another to provide a pulse transmission path having an input end and an output end;

(D) means to supply pulses of current to the input end of said transmission path for transmission along the transmission path to the output end thereof; and (E) a plurality of direct current biasing means each of which is connected to a respective one of a plurality of points along the transmission path to restore the relevant point to a predetermined potential after the passage of each said current pulse past that point in said transmission path, (*a*) a first of said biasing means including a first resistance connected at one of its two ends to a first of said points which point is common to the emitter electrode of a first of said transistors, means for applying to the other end of said resistance a bias potential which is lower in said sense than the potential of the emitter electrode during each said current pulse so that current flows in said first resistance during each said current pulse, and a first rectifier connected between the emitter and base electrodes of said first transistor with its direction of forward conduction opposite to the direction of forward conduction between the emitter and base electrodes in said first transistor so that on the one hand the first rectifier is normally conductive to clamp the emitter electrode of said first transistor to the potential of its base electrode when said first transistor is non-conductive, and on the other hand is non-conductive when said first transistor is conductive, and (*b*) a second of said biasing means including a second resistance connected at one of its two ends to said path at a second of said points, means for applying a bias potential to the other end of said second resistance which is higher in said sense than the potential of said second point at least during each said current pulse so that current flows in said second resistance during each said current pulse thereby at least to tend to compensate for change in magnitude of each said current pulse owing to the current flow in said first resistance, a second rectifier, and means connecting said second rectifier to said second point so as on the one hand to conduct and thereby clamp said second point to a predetermined potential in the absence of any said pulse at said second point, and on the other hand to be non-conductive during a said pulse at said second point.

7. An electric pulse transmission system comprising:
(A) a plurality of first transistor gating stages;
(B) a plurality of means for supplying pulses of current to be gated by the first transistor gating stages respectively;
(C) a common pulse transmission highway connected to all said first gating stages to receive pulses gated thereby;
(D) a plurality of second transistor gating stages connected to said highway to gate pulses therefrom;
(E) each said first and second gating stage comprising a transistor which has emitter, base and collector electrodes, and which is connected in a common-base circuit configuration to be normally non-conductive, means for applying gating pulses to the base electrode of the transistor to reduce the potential of the base electrode in a sense to render the transistor conductive, a resistance connected at one of its two ends to the emitter electrode of the transistor, means for applying to the other end of the resistance a bias potential which potential is lower in said sense than the potential of the emitter electrode so that current flows through said resistance, and a rectifier connected between the emitter and base electrodes of the transistor with its direction of forward conduction opposite to direction of forward conduction between the emitter and base electrodes in the transistor so that on the one hand the rectifier is normally conductive to clamp the emitter electrode to the potential of its base electrode when the transistor is non-conductive, and on the other hand is non-conductive when the transistor is conductive in response to said gating pulses; and
(F) direct current biasing means for said highway and comprising a further resistance connected at one of its two ends to the highway, means for applying a bias potential to the other end of said further resistance which potential is higher in said sense than the potential of said highway so that current flows through said further resistance even during any pulse gated to the highway from said first gating stages, a further rectifier, and means connecting said further rectifier to said highway so as on the one hand to conduct and thereby clamp said highway to a predetermined potential in the absence of any said pulse gated to said highway, and on the other hand to be non-conductive during any said pulse gated to said highway so that the current then flowing through said further resistance at least tends to compensate for change in magnitude of each gated pulse in its transmission through first and second gating stages.

8. An electric pulse transmission system according to claim 7 wherein the emitter electrode of the transistor in each said second gating stage is connected to the highway through a respective rectifier.

References Cited in the file of this patent

UNITED STATES PATENTS

| | | |
|---|---|---|
| 2,657,318 | Rack | Oct. 27, 1953 |
| 2,962,551 | Johannesen | Nov. 29, 1960 |